(12) United States Patent
Wood (10) Patent No.: US 10,007,959 B2
(45) Date of Patent: Jun. 26, 2018

(54) HIGH DENSITY RESIDENTIAL SUBDIVSION WITH COURTYARD COMMON LAYOUT

(71) Applicant: Weekley Homes, LLC, Houston, TX (US)

(72) Inventor: Jack Preston Wood, Houston, TX (US)

(73) Assignee: Weekley Homes, LLC, Houston, TX (US)

( * ) Notice: Subject to any disclaimer, the term of this patent is extended or adjusted under 35 U.S.C. 154(b) by 295 days.

(21) Appl. No.: 14/753,138

(22) Filed: Jun. 29, 2015

(65) Prior Publication Data

US 2016/0379322 A1  Dec. 29, 2016

(51) Int. Cl.
| | |
|---|---|
| *E04F 19/00* | (2006.01) |
| *G06Q 50/16* | (2012.01) |
| *E04H 1/00* | (2006.01) |

(52) U.S. Cl.
CPC ........... *G06Q 50/165* (2013.01); *E04F 19/00* (2013.01); *E04H 1/00* (2013.01)

(58) Field of Classification Search
CPC ........... E04H 1/02; E04F 19/00; F06Q 50/165
USPC .............................................. 52/169.3, 169.2
See application file for complete search history.

(56) References Cited

U.S. PATENT DOCUMENTS

| | | | | |
|---|---|---|---|---|
| 3,732,649 A | * | 5/1973 | Mehran | E04H 1/00 52/169.3 |
| 3,874,137 A | * | 4/1975 | Gentry | E04H 1/00 52/169.1 |
| 3,996,709 A | * | 12/1976 | Coxe | E04H 1/00 52/169.3 |
| 4,745,719 A | * | 5/1988 | Blankstein | E04H 1/02 52/173.1 |
| 4,800,692 A | | 1/1989 | Jenn | |
| 4,852,313 A | * | 8/1989 | Jones | E04H 1/00 52/169.3 |
| 4,942,706 A | * | 7/1990 | Todd | E04H 1/02 52/169.3 |
| 5,469,673 A | * | 11/1995 | Raynor | E04H 1/00 52/169.2 |
| 5,671,570 A | * | 9/1997 | Kaufman | E04H 1/00 52/169.2 |
| 5,761,857 A | * | 6/1998 | Kaufman | E04H 1/00 52/169.2 |
| 6,470,633 B2 | | 10/2002 | Showen | |

(Continued)

*Primary Examiner* — Paola Agudelo
(74) *Attorney, Agent, or Firm* — Hasley Scarano, L.L.P.

(57) ABSTRACT

A residential subdivision layout for high density developments is disclosed which includes placing residential buildings on lots in a configuration such that the front facade of the residential buildings faces a common area, preferably a green space, while the rear facade of the buildings includes a vehicle garage entrance and faces a vehicle passageway. A private courtyards are included between residential buildings on adjacent lots, preferably, on forward portions of the lots between residential buildings such that the courtyards are near, and within visual sight of the common area, but separated from it by a privacy barrier, such as a fence or shrubbery. Preferred configurations not only provide a usable and private outside areas in view of a common space, but create openings between the buildings that allow natural light to enter the interior of the buildings through windows adjacent to the courtyards.

27 Claims, 7 Drawing Sheets

(56) References Cited

U.S. PATENT DOCUMENTS

| | | | |
|---|---|---|---|
| 6,688,052 B1 * | 2/2004 | Flanders | E04H 1/005 52/169.2 |
| 7,036,276 B1 * | 5/2006 | Apel | E04H 1/02 52/169.2 |
| 7,347,642 B1 | 3/2008 | Showen | |
| 8,279,219 B2 | 10/2012 | Ghazali | |
| 9,222,273 B2 * | 12/2015 | Webb | E04H 1/005 |
| 2008/0289265 A1 * | 11/2008 | Lessard | E04H 1/005 52/79.1 |
| 2015/0047272 A1 * | 2/2015 | Webb | E04H 1/005 52/169.3 |

* cited by examiner

HIGH DENSITY RESIDENTIAL SUBDIVSION WITH COURTYARD COMMON LAYOUT

CROSS-REFERENCE TO RELATED APPLICATIONS

None.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to a residential subdivision configuration. More particularly, the present invention relates to an improved high density residential lot configuration and method of providing high density residential subdivisions.

2. Description of the Related Art

Ever increasing costs and demand for urban residential housing led to an ever growing development of high density residential subdivisions. As with many other subdivisions, the land was divided into lots for housing and common areas. Common areas would typically be owned and/or managed by an entity such as a homeowners association. The major difference between a high density residential subdivision and other residential subdivisions was that the residential buildings were closer together, the number of residential buildings per acre was much higher than the average, and there was much less private outside areas. Historically, high density residential subdivisions were originally primarily found in urban areas but the concept spread beyond urban settings into many suburban areas.

Figure 1:
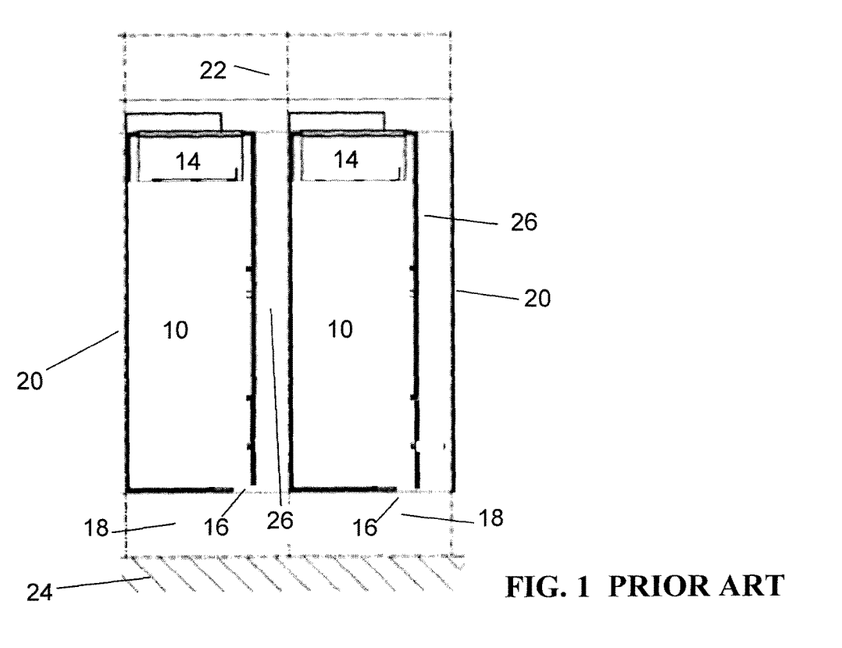
FIG. 1 is a plan view of typical prior art high density housing having a front facade facing a common green area.

Early high density residential subdivisions were laid out by simply making the lots no larger than necessary to include the residential building plus a minimum amount of area surrounding the building to satisfy various housing codes. For example, FIG. 1 shows an example of a prior art high density layout in which generally rectangular residential buildings 10 occupied the majority of the lots 20. A small narrow strip 26 of the lot extended along the building 10 between two adjacent buildings 10. The residential buildings 10 generally had an entrance 16 that faced a common area 24 and a vehicle garage 14 that faced a rear alley 22. While this layout provided high density housing, it also had several significant drawbacks. First, the occupants had essentially no usable, private outdoor area to enjoy. Second, the layout and the close proximity of buildings on the side and the positioning of the garage effectively blocked out most of the natural light from the inside of the building.

Figure 2:
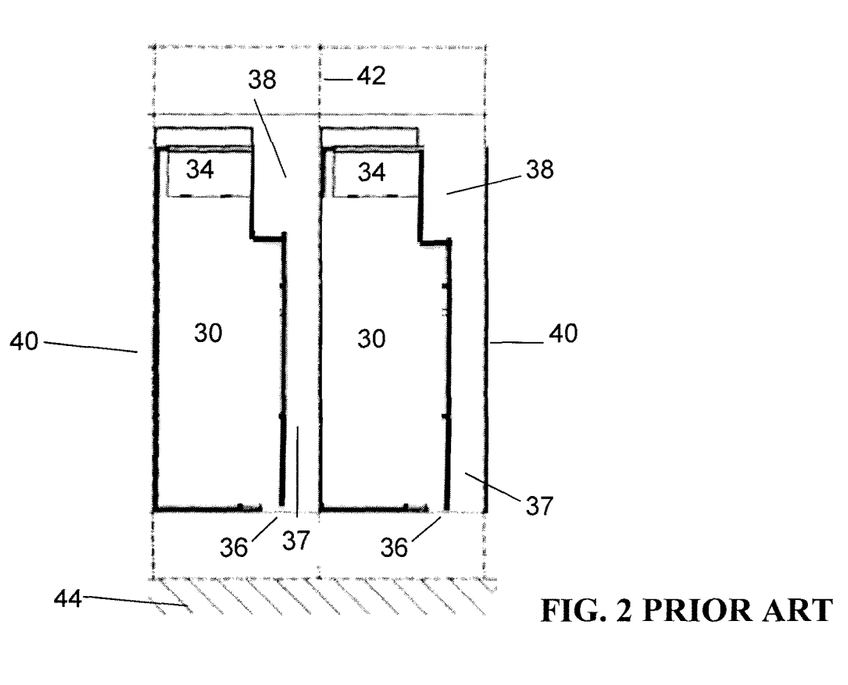
FIG. 2 is a plan view of typical prior art high density housing having a back yard extending toward the side of the house.

Several attempts were made to design high density residential subdivisions that overcame these fundamental problems, but each attempt had significant issues of its own. An example of one prior art attempt to overcome the deficiencies of high density residential housing layouts is shown in FIG. 2. In the layout of FIG. 2, the buildings 30 are placed on the lots 40 in a similar manner as in FIG. 1 with an entrance 36 facing a common area and a vehicle garage 34 facing an ally 42 in the rear. A narrow strip 37 extends between the buildings 30. The modification was to remove a notch from the rear portion of the building 30 and create a small, back-side yard 38 at the rear corner of the lot 40. While this provided an outdoor space, there were several problems with this design. Initially, because the yard 38 was at the rear, it was surrounded by garages and concrete alley making it a particularly hot area during the summers with no particularly aesthetic view. Additionally, this layout did little or nothing to address the issue of a lack of natural light available to the buildings 30, because the garage 34 bordered the yard 38.

Figure 3:
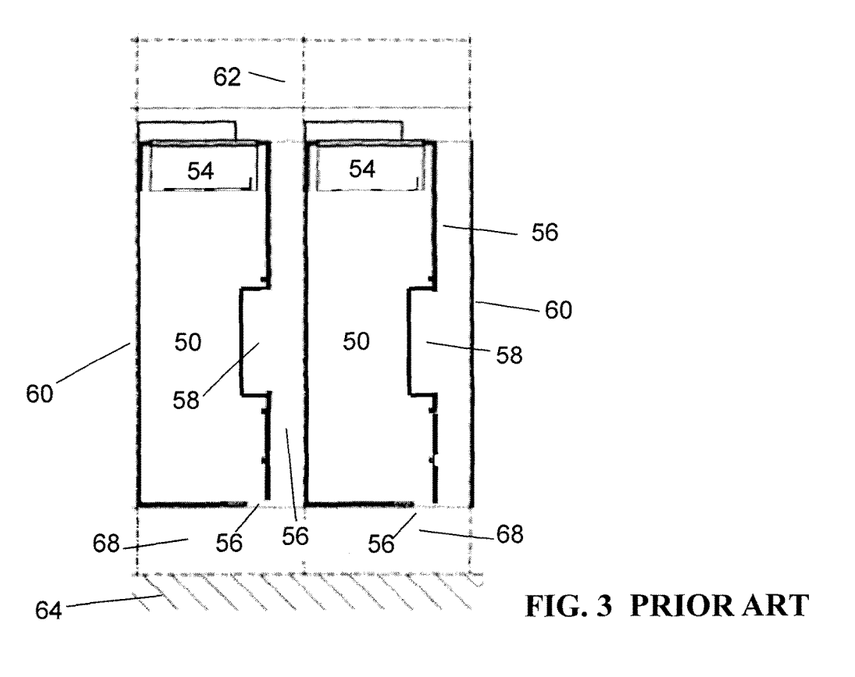
FIG. 3 is a plan view of typical prior art high density housing having a courtyard along a central portion of a side of the house.

FIG. 3 demonstrates another example of an attempt solve the problems associated with high density housing. In the layout of FIG. 3, the buildings 50 are placed on the lots 60 in a similar manner as in FIG. 1 with an entrance 56 facing a common area 64 and a vehicle garage 54 facing an ally 62 in the rear. A narrow strip 56 extends between the buildings 50; however, in this prior art layout a notch is removed from a central portion of the building's side thereby forming a small courtyard 58. While this layout provided a private outdoor space, and removed that space from the concrete alley (such as in FIG. 2), such courtyards 58 were much like a cave, surrounded by high wall which blocked light not only from the house, but also from the courtyard 58.

Another attempt to address the issues created by high density residential housing developments was disclosed in U.S. Pat. No. 5,671,570 to Kaufman. In Kaufman, the inventors detached the vehicle garage from the house and shifted the garage and the rear portion of the lot to the one side to create a larger usable back yard. While Kaufman's layout addressed the issues of a private outdoor space and some of the natural light issues, the design came with several major disadvantages. Initially, detaching the garage places significant limitations on the size of the home, particularly for buildings having two or more floors. Further, the back yard space remains surrounded by concrete and walls which reduce its aesthetic appeal.

As can be seen, the demand for high density residential housing subdivisions has grown, but such high density housing comes with several particular problems including the lack of a usable, enjoyable outdoor space and significant restrictions on the amount of natural light available to the interior of the residences. Attempts have been made to overcome these deficiencies, but each attempt has resulted in significant detrimental attributes and has failed to solve these major problems.

BRIEF SUMMARY OF THE INVENTION

The present invention is an improved residential subdivision layout for high density developments. The improved residential subdivision layout includes placing residential buildings on lots in a configuration such that the front facade of the residential buildings faces a common area, preferably a green space or a common street with green perimeters and front facades, while the rear facade of the buildings includes a vehicle garage entrance and faces a vehicle passageway. The improvement comprises the inclusion of private courtyards between residential buildings on adjacent lots. Preferably, the courtyards are positioned on a forward portion of the lot between the residential buildings such that the courtyards are near, and within visual sight of the common area, but separated from it by a privacy barrier, such as a fence or shrubbery. The preferred courtyard common configurations not only provide a usable and private outside areas in view of a common green space, but create openings between the buildings that allow natural light to enter the interior of the buildings through windows adjacent to the courtyards.

In a particular embodiment, the present invention comprises a residential subdivision having a plurality of lots, each lot having a first property line defining a front of the lot, a second property line defining a rear of the lot, and third and fourth property lines defining the sides of the lot. The second property line is proximate to a vehicle passageway and the first property line being proximate to a common area, preferably a green space. A first building is disposed on the lot within the property lines. The first building has a forward portion nearest to the first property line and a rear portion nearest to the second property line, the rear portion of the building comprises a vehicle garage and the forward portion comprises a front door entrance. One side of the first building comprises a forward side along the front portion of the building, a rear side along the rear portion of the building, and an intermediate facade on the rear portion of the dwelling, the forward side being recessed relative to the rear side from the side property line, such that the rear portion of the building has a width greater than a width of the front portion. The intermediate facade is disposed between the forward and rear side portions of the building and generally faces toward the first property line. A courtyard is on one side of the building and proximate to the forward portion of the building and is defined by one side of a second building disposed on an adjacent lot, the forward side of the front portion of the first building, at least the intermediate facade on the rear portion, and a privacy barrier, said privacy barrier being positioned between to the intermediate facade of the building and the front property line.

Additional advantages of the invention are set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

A better understanding of the present invention can be obtained when the following detailed description of the disclosed embodiments is considered in conjunction with the following drawings in which.

DETAILED DESCRIPTION OF THE INVENTION

The present invention is an improved residential subdivision layout for high density developments. The improved residential subdivision layout includes placing residential buildings on lots in a configuration such that the front facades of the residential buildings face a common area, preferably a green space or a common street with green perimeters and front facades, while the rear facades of the buildings, which include vehicle garage entrances, face a vehicle passageway. The improvement comprises the inclusion of private courtyards between residential buildings on adjacent lots. Preferably, the courtyards are positioned on a forward portion of the lot between the residential buildings such that the courtyards are near, and within visual sight of the common area, but separated from it by a privacy barrier, such as a fence or shrubbery. Preferred configurations not only provide a usable and private outside areas in view of a common green space, but create openings between the buildings that allow natural light to enter the interior of the buildings through windows adjacent to the courtyards.

The unique configuration combining a courtyard at the front side of the lot in view of the common area overcomes the deficiencies of the prior art by allowing natural light into house to light living, kitchen, and dining areas. Such an arrangement is more aesthetically pleasing because the courtyard can look out over a common area, preferably a green space, which makes the courtyard look and feel larger. This configuration also eliminates prior art problems of heat emanating from concrete surrounding back or side yards. Because the courtyard gets adequate light in this arrangement, grass, plants, and other shrubs can be utilized in the courtyard to enhance the residents' enjoyment of the space.

Figure 4:
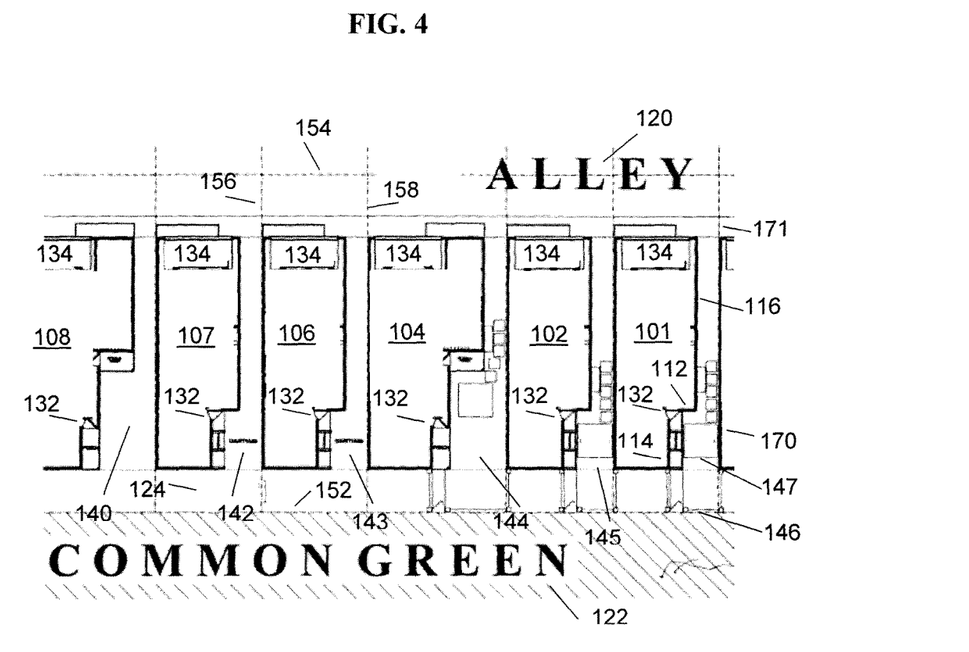
FIG. 4 is a plan view of an embodiment of an improved residential subdivision layout made in accord with the present invention.
Figure 8:
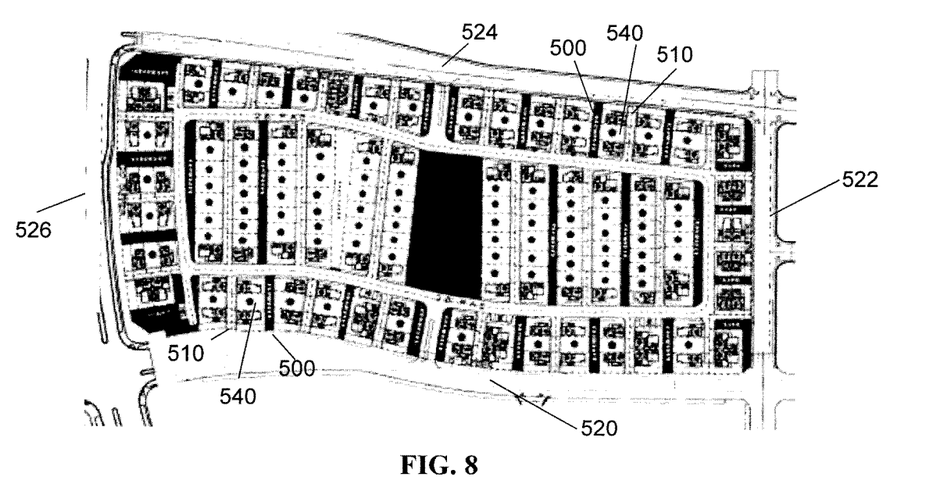
FIG. 8 is a plan view of an embodiment of residential subdivision layout made in accord with the present invention.
Figure 9:
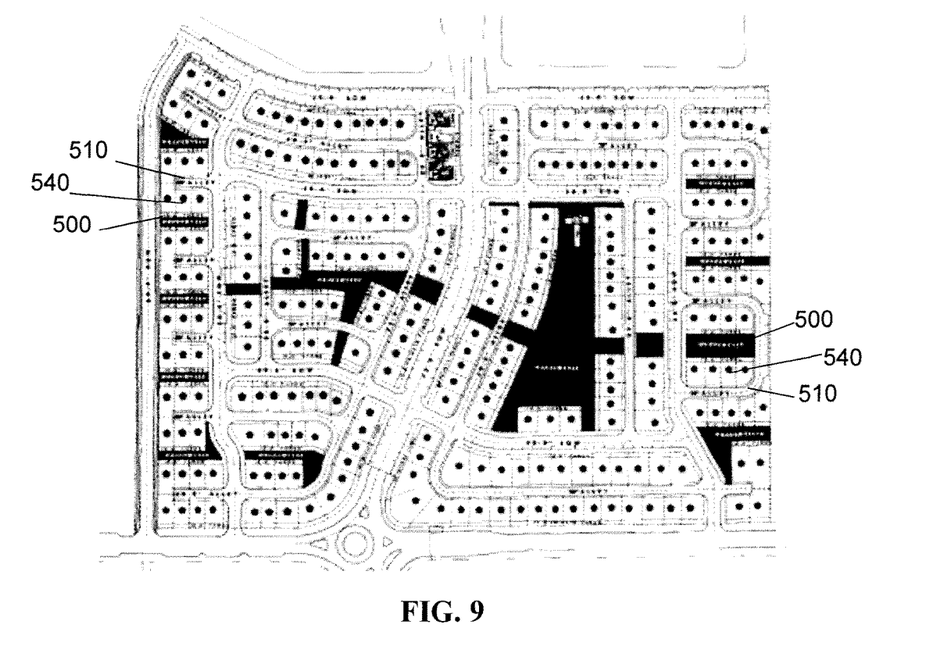
FIG. 9 is a plan view of an embodiment of residential subdivision layout made in accord with the present invention.

One particular embodiment of a high density residential subdivision is disclosed in FIG. 4. As will be recognized by those of skill in the art, a high density subdivision comprises a section of land that is partitioned into a number of lots 124. The lots include a first property line 152 that defined the forward boundary of the lot, a rear property line 154 that defines the rear boundary of the lot, and third and fourth property lines 156 and 158 that define the sides of the lots. While the lots in FIG. 4 are shown as generally rectangular, the lots may have other shapes as needed based upon the available land, street layout, land contours, etc. FIGS. 8 and 9 depict various examples of other acceptable shapes and show that shapes may vary within a particular subdivision. In preferred embodiments, lots 124 are less than about twenty-two hundred square feet. In other preferred cases lots 124 may be less than about fourteen hundred square feet. As shown in FIG. 4, lots 124 can be approximately the same size, or vary in size within a subdivision.

As shown in FIG. 4, buildings 101, 102, 104, 106, 107 and 108 are designed for placement on lots 124 within the property lines 152, 154, 146, and 158. Preferably, buildings 101, 102, 104, 106, 107 and 108 are residential buildings having between one to four stories and wood framing. In preferred embodiments, the residential buildings are single family homes, but can be duplexes or other configurations with up to four single family units. In a preferred embodiment, the residential buildings comprise between about one thousand-four hundred to three thousand-eight hundred square feet of living space (vehicle garage included). In one or two story embodiments, the buildings preferably comprise between about one thousand-four hundred to about two thousand-six hundred square feet of living space. In three to four story embodiments, the buildings preferably comprise between about two thousand-five hundred to about three thousand-eight hundred square feet of living space. As shown in FIG. 4, the buildings can be of different sizes, shapes, and designs within the same subdivision. In some embodiments, buildings can be connected along the rear portion without departing from the spirit and scope of the present invention.

The nature of a high density residential subdivision requires that the residential building occupy a larger percentage of the lot than would the average residential subdivision in a particular area. While various ordinance and regulations can vary from place to place, in preferred embodiments, the residential building will occupy between about 45% and about 70% of the lot 124.

As shown in FIG. 4, residential buildings 101, 102, 104, 106, 107 and 108 have a vehicle garage 134 in the rear portion of the building. In some embodiments, vehicle garage 134 may include a dual vehicle garage. Vehicle garage 134 opens to toward the rear property line and is connected, directly or indirectly, to a vehicle passageway 120 to allow access to the vehicle garage 134. Vehicle passageway 120 can be an alley, a shared drive, or in some instances, a street. Rear property line 154 can be proximate to the vehicle passageway or may form the midway point of the vehicle passageway, or some similar arrangement.

A common area 122 lies in front of lots 124, preferably adjacent to forward property line 152. In a preferred embodiment, common area 122 is a green space. As will be understood by a person of skill in the art, a green space comprises an area of land generally devoid of buildings and development, and typically covered by grass, trees, and or shrubs. A green space may also comprise sidewalks and/or walkways, or other amenities such as a playgrounds, swimming pools and/or small ponds. While the common area 122 will preferably be a green space, in other instances the common area could be a paved area, for example paved with paving stones, cinders, etc. or even in some cases, a street with green perimeters. Common area 122 is preferably between about 12 to 25 feet in depth, and more preferably about 15 to 30 feet, and extends along the front property line of several lots 124 in the subdivision.

As shown in FIG. 4, one particularly unique feature of the high density residential subdivision of the present invention is the inclusion of courtyards 140, 142, 143, 144, 145, and 147 in view of the common area 122. As used herein, the term courtyard refers to an outside area of the lot, not covered by the building, and adjacent to one side of the building near the front portion of the building. As an example, to form the courtyard 147, a side 114 along the front portion of the building 101 is recessed away from the side property line 171 relative to the side 116 along the rear portion of the house. An intermediate façade 112 connects the front side 114 and the rear side 116. The limits of the courtyard 147 are then generally defined by the front side 112 of the building 101, the intermediate façade 112, a privacy barrier 146 and the outside wall 170 of the building on the adjacent lot. While the buildings shown in FIG. 4 are generally rectangular, the courtyard does not require linear or rectangular walls and can include curved or angled walls or similar known design variations for residential buildings.

As will be recognized by a person of skill in the art, the courtyard dimension can vary significantly depending upon the size and dimensions of the lot, the size and dimensions of the house, various deed restrictions and regulations, etc. In a preferred embodiment the courtyard would be at least about eight to fourteen feet in width, and more preferably at least about ten to twelve feet in width. The length of the courtyard can also vary between significantly with smaller courtyards 142, 143 and 146 having lengths of between about ten to fifteen feet, and large courtyards 140 and 144 having lengths of fifteen to thirty feet. Preferably, courtyards 140 to 147 have a minimum area of about one hundred and fifty square feet or between about ten and fifteen percent of the total lot area.

As will be recognized, courtyards 140, 142, 143, 144, 145 and 147 can include many variations of landscaping and amenities. Courtyards 145 and 147 depict a portion of the courtyard primarily having a ground covering such as paving stones, decking, or other similar ground coverings. Larger courtyards may contain other outdoor features such as small pools or other water features, and outdoor fire places (see FIG. 6, feature 372). The unique feature of having the courtyard next to the common area allows light into the courtyard which expands the landscaping options over prior art options such as central courtyards. The light allows grass and shrubs to grow in the courtyard space. As shown in FIG. 4, courtyards 140 and 142 can be simply an open outdoor space with grass coverage, while courtyard 144 combines paved areas with grass and landscaping.

As discussed above, the outside wall 170 of the residential building on the adjacent lot forms the outside boundary of the courtyard. For example, in FIG. 4, the outside wall (left) of building 102 forms the outer boundary of courtyard 144. Preferably, the residential buildings are built in a zero property line arrangement where the outside wall of the adjacent building is built at the property line. In this arrangement, the entirety of the courtyard falls within the lot of residential building for which the courtyard is intended. Other arrangements can be utilized in which the courtyard extends over the property line onto the adjacent lot, but easements and/or other deed arrangements become necessary to ensure the ability to fully utilize the courtyard and retain the privacy. Preferably, the outside wall of the adjacent house that forms the courtyard will not have windows to enhance the courtyard privacy, and which is generally consistent with various housing regulations and fire codes.

As shown in FIG. 4, the forward limit of the courtyard is generally defined by a privacy barrier 146. The privacy barrier 146 can be a privacy fence, shrubbery, or other similar landscaping element. As will be recognized by those of skill in the art, a privacy barrier must strike a balance between giving the resident a sense of privacy in the courtyard and allowing the resident to see the green space and allow ample light into the courtyard. Preferably the privacy barrier 146 is between about two and a half feet and about five feet in height. More preferably, the privacy barrier 146 is no more than about four feet in height. As used herein, privacy fence is meant to broadly include multiple kinds of fencing, including but not limited to picket fences, plank fences, farm fencing, and the like. Preferably, privacy barrier 146 is positioned along a line that runs generally parallel to the front façade of the building and the front property line and lies generally between the two. Other positions for privacy barrier 146 can also be acceptable from being positioned along the front property line to proximate the front façade, depending upon the particular design of the building. While FIG. 4 depicts a privacy barrier in a generally linear fashion, privacy barrier 146 can be of other configurations, such as curved or L-shaped, and privacy barrier 146 is not necessarily parallel with the property line or the front façade of the building.

Figure 5:
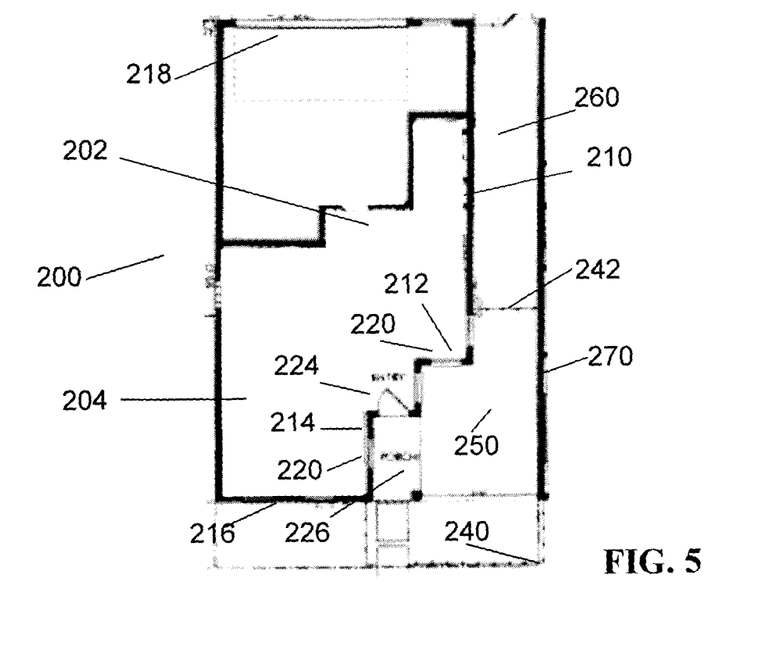
FIG. 5 is a plan view of an embodiment of a residential building and lot suitable for use in an improved residential subdivision layout made in accord with the present invention.
Figure 6:
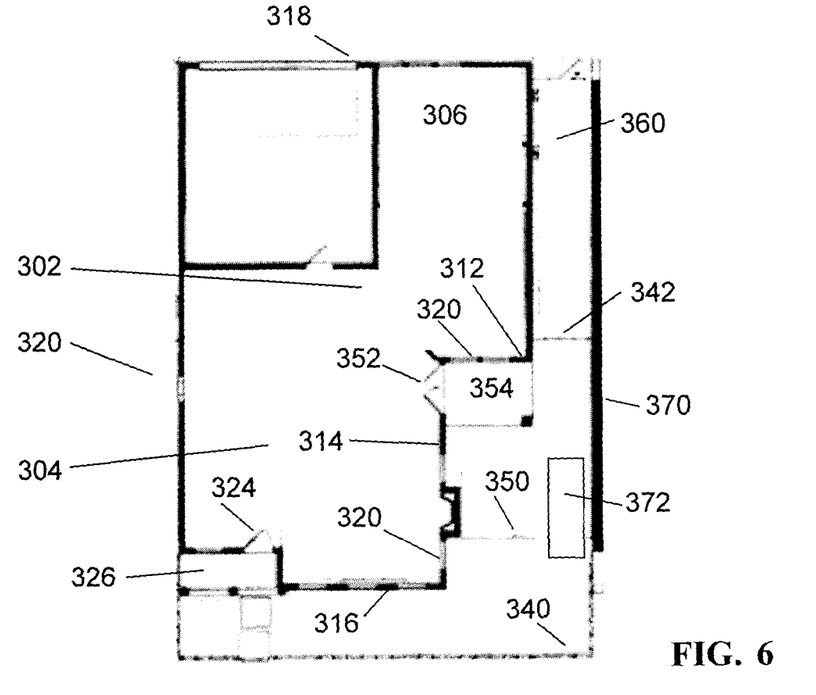
FIG. 6 is a plan view of a second embodiment of a residential building and lot suitable for use in an improved residential subdivision layout made in accord with the present invention.
Figure 7:
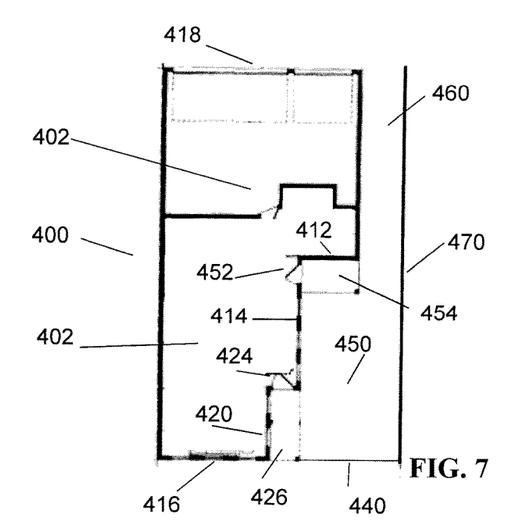
FIG. 7 is a plan view of a third embodiment of a residential building and lot suitable for use in an improved residential subdivision layout made in accord with the present invention.

As shown in FIGS. 5, 6, and 7, the courtyard common concept can be applied with a variety of different building and lot layouts. FIG. 5 depicts an embodiment of a basic building/lot layout for a high density subdivision designed in accord with the present invention. As can be seen, courtyard 250 is positioned adjacent to a front portion 204 of the residential building 200 and separated from a common green area by privacy fence 240. The courtyard 250 is defined by the front side 214 and the intermediate façade 212 of the residential building 200, the privacy fence 240, and the outside wall 270 of the adjacent building. The entryway 224 to building 200 is recessed from the front façade 216 and includes a porch 226 which provides access to the courtyard 250. Inclusion of the courtyard 250 near the common area allows an abundance of natural light to reach the courtyard and, through windows 220, the interior of the building 200. An optional fence 242 separates the courtyard from the side yard 260 of the lot.

FIG. 6 depicts another embodiment of building/lot layout designed in accordance with the high density residential subdivision of the present invention. The design of FIG. 6 is preferably utilized for larger sized high density lots. In this particular design, entryway 324 is on the opposite side and separate from the courtyard 350. Access to courtyard 350 is given primarily through a set of French doors 352 on the front side 314 and side porch 354. Courtyard 350 is defined by front side 314 and intermediate façade 312 of building 300, along with privacy fence 340 and outside wall 370 of the adjacent building. Optional fence 342 separates side yard 360 from courtyard 350. Windows 320 along the front side 314 and intermediate façade 312 of the building 300 allow natural light to pass into the interior of building 300.

FIG. 7 depicts yet another embodiment of building/lot layout designed in accordance with the high density subdivision of the present invention. As can be seen, courtyard 450 is positioned adjacent to a front portion 404 of the residential building 400 and separated from a common green area by privacy fence 440. The courtyard 450 is defined by the front side 414 and the intermediate façade 412 of the residential building 400, the privacy fence 440, and the outside wall 470 of the adjacent building. The entryway 424 to building 400 is recessed from the front façade 416 and includes a porch 426 which provides access to the courtyard 450. Further access to courtyard 450 is given through a side door 452 on the front side 414 and side porch 454. Inclusion of the courtyard 450 near the common area allows an abundance of natural light to reach the courtyard and, through windows 420, the interior of the building 400.

FIGS. 8 and 9 depict to embodiments of high density subdivisions designed in accord with the present invention. In FIG. 8, the high density subdivision is surrounded by streets 520, 522, 524, and 526. As shown within FIGS. 8 and 9, within the subdivisions lots are divided and generally laid out such than a common area 500, preferably a green space, abuts the front of the lot and a vehicle passageway 510 abuts the rear portion of the lot. Preferably, designs such as shown in FIGS. 4-7 or other similar embodiments will be utilized throughout the subdivision to provide the courtyard common design advantages. While preferably most lots in the high density subdivision utilize there courtyard common design, it is within the scope of the invention to include some lots within the high density subdivision that do not follow this layout without departing from the scope and spirit of the invention.

While the terms used herein are believed to be well-understood by one of ordinary skill in the art, definitions are set forth to facilitate explanation of certain of the presently-disclosed subject matter.

Following long-standing patent law convention, the terms "a", "an", and "the" refer to one or more when used in this application, including the claims. Thus, for example, reference to "a window" includes a plurality of such windows, and so forth.

Unless otherwise indicated, all numbers expressing quantities of elements, dimensions such as width and area, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of a dimension, area, percentage, etc., is meant to encompass variations of in some embodiments plus or minus 20%, in some embodiments plus or minus 10%, in some embodiments plus or minus 5%, in some embodiments plus or minus 1%, in some embodiments plus or minus 0.5%, and in some embodiments plus or minus 0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter. With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, S, C, and/or O" includes A, S, C, and O individually, but also includes any and all combinations and subcombinations of A, S, C, and O.

As used herein, "proximate" means near, but not necessarily at a specific point. For example, a property line is considered proximate to an object if it is within 10 feet of that object.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. The foregoing disclosure and description are illustrative and explanatory thereof, and various changes in the details of the illustrated apparatus and construction and method of operation may be made without departing from the spirit in scope of the invention which is described by the following claims.

I claim:

1. An improved residential subdivision having a plurality of lots, at least one lot of said plurality of lots having a first property line defining a front of the lot, a second property line defining a rear of the lot, and third and fourth property lines defining the sides of the lot, and a first building disposed on the lot within the property lines, said second property line being proximate to a vehicle passageway and said first property line being proximate to a common area, said first building having a front portion nearest to the first property line and a rear portion nearest to the second property line, the rear portion of the first building comprising a vehicle garage and the front portion comprising a front door entrance, the improvement comprising:
   said at least one lot of said plurality of lots having a courtyard on one side of said first building and adjacent to the front portion of said first building;
   wherein one side of said first building comprises a forward side along the front portion of the building, a rear side along the rear portion of the first building, and an intermediate facade on the rear portion of the first building, the forward side being recessed relative to the rear side from the side property line, such that the rear portion of the first building has a width greater than a width of the front portion, and the intermediate facade is disposed between the forward and rear sides of the first building and generally disposed toward the first property line;
   wherein said courtyard is defined by one side of a second building disposed on an adjacent lot, the forward side of the front portion of the first building, the intermediate facade on the rear portion, and a privacy barrier, said privacy barrier being positioned between to the intermediate facade of the first building and the front property line; and
   wherein said first building and said second building comprise single family residences.

2. The improved residential subdivision of claim 1, wherein the first and second buildings comprises residential buildings having at least two, but not more than four floors.

3. The improved residential subdivision of claim 1, wherein the common area comprises a green space.

4. The improved residential subdivision of claim 1, wherein the courtyard has a width of at least about 8 feet.

5. The improved residential subdivision of claim 1, comprising lots of no less than about 2200 square feet.

6. The improved residential subdivision of claim 1, comprising lots of no less than about 1400 square feet.

7. The improved residential subdivision of claim 1, wherein the courtyard comprises at least 150 square feet.

8. The improved residential subdivision of claim 1 wherein the courtyard comprises at least about 10 percent of the first lot.

9. The improved residential subdivision of claim 1 wherein the intermediate facade of the first building comprises at least one window facing the courtyard.

10. The improved residential subdivision of claim 1 wherein the forward side of the first building comprises at least one window facing the courtyard.

11. The improved residential subdivision of claim 1, wherein the second building is immediately adjacent to the side property line of the first lot.

12. The improved residential subdivision of claim 1, where in the second building is about three feet from the side property line of the first lot.

13. The improved residential subdivision of claim 1, wherein the courtyard of the first lot extends over the side property line onto the second lot.

14. The improved residential subdivision of claim 1, wherein the vehicle passageway comprises an alleyway.

15. The improved residential subdivision of claim 1, wherein the vehicle passageway comprises a shared driveway.

16. The improved residential subdivision of claim 1, wherein the vehicle passageway comprises a street.

17. The improved residential subdivision of claim 1 wherein the first building further comprises a front porch immediately adjacent to the front door entrance, wherein the courtyard can be accessed from the front porch.

18. The improved residential subdivision of claim 1 wherein the first building further comprises a side door entrance and the courtyard is accessible through the side door entrance.

19. The improved residential subdivision of claim 18, wherein the side door entrance comprises French doors to provide additional light to the building.

20. The improved residential subdivision of claim 1, wherein the courtyard comprises paving stones.

21. The improved residential subdivision of claim 1, wherein the courtyard comprises grass.

22. The improved residential subdivision of claim 1, wherein the courtyard comprises decking.

23. The improved residential subdivision of claim 1, wherein the privacy barrier has a height of no more than about 5 feet.

24. There improved residential subdivision of claim 1, wherein the privacy barrier comprises a fence.

25. There improved residential subdivision of claim 1, wherein the privacy barrier comprises shrubbery.

26. The improved residential subdivision of claim 1, wherein the front portion of the first building comprises a front facade facing the front property line and wherein the privacy barrier extends outwardly from the front facade of the first building such that the barrier is closer to the front property line than the front facade.

27. An improved residential subdivision having a plurality of lots, at least one of said plurality of lots having no more than 2200 square feet in area, and having a first property line defining a front of the lot, a second property line defining a rear of the lot, and third and fourth property lines defining the sides of the lot, and a first building disposed on the lot within the property lines, said second property line being proximate to a vehicle passageway and said first property line being proximate to a common area, said first building having a front portion nearest to the first property line and a rear portion nearest to the second property line, the rear portion of the first building comprising a vehicle garage and the front portion comprising a front door entrance, said first building being a residential building having between two to four floors, the improvement comprising:

said at least one lot of said plurality of lots having a courtyard on one side of said first building and adjacent to the front portion of said first building, the courtyard having a width of at least ten feet and an area of at least 150 square feet;

wherein one side of said first building comprises a forward side along the front portion of the building, a rear side along the rear portion of the first building, and an intermediate facade on the rear portion of the first building, the forward side being recessed relative to the rear side from the side property line, such that the rear portion of the first building has a width greater than a width of the front portion, and the intermediate facade is disposed between the forward and rear sides of the first building and generally disposed toward the first property line;

wherein the forward side and the intermediate facade comprise at least one window each;

wherein said courtyard is defined by one side of a second building disposed on an adjacent lot, the forward side of the front portion of the first building, the intermediate facade on the rear portion, and a privacy fence, said privacy fence being positioned between the intermediate facade of the first building and the front property line;

wherein said first building and said second building comprise single family residences; and wherein said common area proximate to the first property line comprises a green space.

* * * * *